United States Patent Office

2,929,836

PREPARATION OF CERTAIN HYDROXAMIC ACIDS

Piero M. Carrara, Milan, Italy

No Drawing. Application July 9, 1957
Serial No. 670,641

Claims priority, application Italy July 13, 1956

2 Claims. (Cl. 260—500)

Cycloserine is an antibiotic produced by a strain of streptomyces.

Its chemical structure is that of D-4-amino-3-isooxazolidone.

Its synthesis has been described by American authors in J.A.C.S., 77, 2347 (1955), starting from DL-serine, by conversion of this aminoacid into its methyl ester, condensation of the same with ethyl imino benzoate into the corresponding oxazoline, conversion of the latter into the corresponding hydroxamic acid, chlorination of this last-named compound with opening of the oxazolinic ring and re-condensation of the chlorohydroxamic acid into substituted isooxazolidone.

The latter is then opened again with hydrochloric acid and the methyl ester of a β-amino-oxyalanine is obtained, from which racemic cycloserine is finally obtained with loss of the benzoic radical.

Racemic cycloserine thus obtained may be separated into its active components by means of tartaric acid.

We have found that it is possible to prepare cycloserine and its derivatives starting from beta ketonic acids and their derivatives.

$$R_1COCH_2COOK \qquad (I)$$

These products are then transformed into the corresponding alpha acyl amidic acids

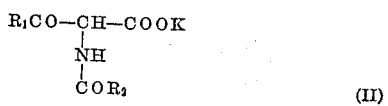

(II)

These are subsequently transformed in the alpha methyl condensation products.

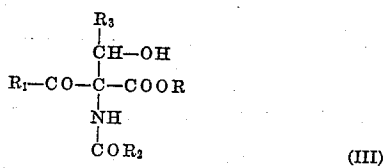

(III)

(see Carrara G., D'Amato V., Bellenghi M., Gazz. Chim. Ital., 1950, 822).

From the Compound III, it is possible to go on, following the procedures described below with protection of the —CO— by transforming it into the corresponding hydrazone by means of an hydrazine:

(1) *Oxamation.*—Substitution of

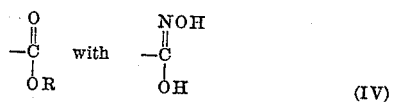

(IV)

(2) *Chlorination.*—Transformation of

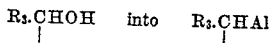 into R₃.CHAl (V)

(3) *Condensation.*—Condensation of (V) into 4-acyl-amino-3-isooxazolidone-4-acyl-5-R₃ (VI).

(4) *Ring opening.*—Opening of the oxazolidone (VI) to obtain the beta amino-oxy-alpha-acyl-ester of a beta substituted alanine (VII).

(5) *Closure.*—Closure to racemic 4-amino-5-R₃ substituted 3-isooxazolidone (racemic 5-substituted cycloserine) (VIII).

(6) *Antipods separation.*—Separation of the antipods of (VIII) (IX).

A step 1-bis consisting in the closure of an oxazolinic ring between the β-oxydryl and the carbonyl of the acyl to the α-amino group of the serinic chain of the Compound III may go before all the above mentioned steps.

R₁ in (III) may be an alkyl or aryl (substituted or not), an aralkyl or a heterocyclic ring (substituted or not), or an alkoxy radical; R₂ may be an alkyl or aryl, aralkyl or ethero cyclic ring (substituted or not); R₃ may be an alkyl, aryl, aralkyl, or a heterocyclic ring (furyl or thienyl) (substituted or not); R is an alkyl with a C₁ to C₄ chain.

In the case that R₁ is an alkoxy group, a supplementary step 5 bis will be necessary, in which a semisaponification or decarboxylation takes place, before or after step 5.

Steps 1 to 6 may be changed in their subsequence, e.g.:

(1 bis)  1→2→3—4→5→6
         2→1→3→4→5→6

The above mentioned changes are possible also with an optically active Compound III, in which case an optically active isooxazolidone (cycloserine) is obtained.

EXAMPLES

Example 1

0.04 mol. of alpha-acetylamino-alpha-benzoyl-beta-hydroxy methyl propionate (III) is treated at cool temperature with concentrated sulfuric acid. The solution is then sprayed on cracked ice, the mixture is neutralized with an alkali metal or alkaline earth carbonate, filtered if necessary, and extracted in ether. 2-methyl-4-benzoyl-4-carbomethoxy-4-oxazoline is obtained from the extract.

Example 2

0.04 mol. of alpha-benzoylamino-alpha acetyl-beta-hydroxy ethyl propionate (III) is treated for a period of 2 hrs. in ether at 5° C., with 0.08 mol. of thionyl chloride. The mixture is then evaporated under vacuum at low temperature, the residue is treated with pyridine and then with water made alkaline by means of Na carbonate.

2-phenyl-4-acetyl-4-carboethoxy-4-oxazoline is obtained by extracting with ether.

Example 3

0.05 mol. of alpha-benzoylamino-alpha-acetyl-beta-hydroxy ethyl butyrate (III) is treated in acetic acid with phenyl-hydrazine. The phenylhydrazone of alpha-benzoylamino-alpha-acetyl-beta-hydroxy ethyl butyrate precipitates.

Example 4

The alcoholic solution of an equivalent of hydroxylamine is added to an alcoholic solution of the phenylhydrazone of alpha-benzoylamino-alpha-acetyl-beta-hydroxy ethyl butyrate. The mixture is agitated at room temperature 24 hrs., and the phenylhydrazone of the alpha - benzoylamino-alpha-acetyl-beta-hydroxy-butyrhydroxamic acid (IV phenylhydrazone) is obtained.

Example 5

The alcoholic solution of an equivalent of hydroxylamine is added to an alcoholic solution of alpha acetylamino - alpha - benzoyl-beta-hydroxy methyl propionate. The mixture is agitated for 24 hrs. at room temperature and the alpha-acetylamino-alpha-benzoyl-beta-hydroxy-propionhydroxamic acid (IV) is obtained.

Example 6

An ether solution (at 5°) of alpha-acetylamino-alpha-acetyl-beta-hydroxy propionhydroxamic acid is treated with thionyl chloride and agitated for 2 hrs. The ether is evaporated under vacuum, the residue is re-dissolved in cold pyridine and poured in ice made alkaline by means of Na carbonate. The 2-methyl-4-acetyl-4-hydroxamic acid of the 4-oxazolidine (IV bis) is obtained.

Example 7

The 2-methyl-4-acetyl-4-hydroxamic acid of the 4-oxazolidine (IV bis) is boiled 1 hr. with conc. HCl. The beta - chlor-alpha-acetyl-alpha-amino-propionhydroxamic acid (V hydroxamic) is obtained by extracting with ether.

Example 8

1 mol. of chloroacetyl benzoyl is treated in 1 lt. of 50% alcohol with 2 mol. of NaCl and 4 mol. of ammonium carbonate. The mixture is agitated 4 hrs., then concentrated to 500 cc. at 60°. The mixture is acidified with 150 cc. of conc. HCl, then heated to 90° and the hydantoin is allowed to crystallize. The latter is filtered and treated under reflux for 6 hrs. with 20% HCl. The mass is filtered and allowed to crystallize. Alpha-amino-alpha - benzoyl - beta - chlorpropionic acid hydrochloride (alpha-benzoyl-beta-chloralanine) is obtained.

Example 9

Alpha - benzoyl-beta-chlor-alpha-amino methyl propionate (V) is treated in alcohol with the calculated amount of hydroxylamine. 24 hrs. later alpha-benzoyl-beta-chlor-alpha-amino propionhydroxamic acid (V hydroxamic) is obtained by distillating the solvent under vacuum.

Example 10

Alpha - amino-alpha-acetyl-propionhydroxamic acid is treated at a temperature of 10° to 30° C., with aqueous KOH (5% to 20%), corresponding to 1 to 3 moles and the mixture is agitated 24 hrs. The 4-acetyl-4-amino-3-isooxazolidone crystallizes by acidification at pH 6.

Example 11

Alpha-amino-alpha-benzoyl propionhydroxamic acid is treated at a temperature of 60° to 80° C., with 30% aqueous KOH, corresponding to 1 to 3 moles and the mixture is agitated 24 hrs. The 4-amino-3-isooxazolidone crystallizes by acidification at pH 6 (racemic cycloserine) M.P. 140–142° C.

Example 12

1 mol. of 4-benzamino-4-acetyl-3-isooxazolidone is treated in methyl alcohol with gaseous HCl. Beta-aminooxy-alpha acetyl methyl alaninate di-hydrochloride is obtained.

Example 13

Alpha-amino-oxy-alpha-benzoyl alanine ethyl ether, is treated at a temperature of 60° to 80° C. with 30% aqueous KOH, corresponding to 1 to 3 moles and the mixture is agitated 24 hrs. 4-amino-3-isooxazolidone crystallizes by acidifying at pH 6 (cycloserine) M.P. 140°–142° C.

Example 14

Alpha-amino-alpha-benzoyl-3-chlorpropionic acid hydrochloride is separated into its optical antipods by means of its brucine salt. D-alpha-amino-alpha-benzoyl-beta-chlorpropionic acid and L-alpha-amino-alpha-benzoyl-beta-chlorpropionic acid hydrochlorides are obtained.

Example 15

L-alpha-benzoyl-alpha-amino-beta-chlor methyl propionate, is treated in alcohol with the calculated amount of hydroxylamine. 24 hrs. later, L-alpha-benzoyl-alpha-amino-beta-chlorpropionhydroxamic acid is obtained by evaporating the solvent.

Example 16

Alpha - amino - alpha-benzoyl-beta-chloro-beta-methyl propionhydroxamic acid is treated at a temperature of 10° to 30° C. with aqueous KOH, corresponding to 1 to 3 moles and the mixture is agitated 24 hrs. 5-methyl-4-benzoyl-4-amino-3-isooxazolidone, precipitates by acidifying at pH 6.

Example 17

5-propyl-4-benzoyl-4-amino-3-isooxazolidone is treated at 60° C. with 30% aqueous KOH, corresponding to 1 to 3 moles and the mixture is agitated 24 hrs. 5-propyl-4-amino-isooxazolidone (propylcycloserine) crystallizes by acidifying to pH 6.

What I claim is:

1. A process which comprises reacting beta-oxy-alpha-acetylamino-alpha benzoyl-methyl propionate with hydroxylamine in ethyl alcohol to produce beta oxy-alpha acetylamino-alpha benzoyl propionohydroxamic acid.

2. The process which comprises reacting beta-oxy-alpha-acetylamino-alpha-benzoyl-propionhydroxamic acid of the formula:

$$\begin{array}{c} \text{NH--C--CH}_3 \quad \text{H} \\ | \quad\quad\quad\; | \\ \text{H--CH--C--------C--N--OH} \\ | \quad\quad | \quad\quad\quad\;\; \| \\ \text{OH} \quad \text{COC}_6\text{H}_5 \quad\; \text{O} \end{array}$$

with an ionizable halide to produce beta-halo-alpha-acetylamino-alpha-benzoyl-propionhydroxamic acid.

References Cited in the file of this patent

UNITED STATES PATENTS 2,772,281     Holly                 Nov. 27, 1956

OTHER REFERENCES

Kuehl et al.: J. Am. Chem. Soc., vol. 77, pp. 2344-7 (1955).

Carrara et al.: Gazz. Chim. et al., vol. 80, pp. 822–830 (1950).